(12) United States Patent
Lai

(10) Patent No.: US 12,284,478 B2
(45) Date of Patent: Apr. 22, 2025

(54) ISOLATOR AND/OR A LINK

(71) Applicant: CENTURY STEP AUDIOTECH LIMITED, New Territories (HK)

(72) Inventor: Yuk Shing Lai, New Territories (HK)

(73) Assignee: CENTURY STEP AUDIOTECH LIMITED, New Territories (HK)

( * ) Notice: Subject to any disclaimer, the term of this patent is extended or adjusted under 35 U.S.C. 154(b) by 0 days.

(21) Appl. No.: 18/518,885

(22) Filed: Nov. 24, 2023

(65) Prior Publication Data
US 2024/0348972 A1   Oct. 17, 2024

Related U.S. Application Data

(60) Provisional application No. 63/596,742, filed on Nov. 7, 2023, provisional application No. 63/496,501, filed on Apr. 17, 2023.

(51) Int. Cl.
*H04R 1/28* (2006.01)
*H04R 1/02* (2006.01)

(52) U.S. Cl.
CPC ........... *H04R 1/2884* (2013.01); *H04R 1/026* (2013.01); *H04R 2201/025* (2013.01); *H04R 2201/029* (2013.01); *H04R 2400/11* (2013.01)

(58) Field of Classification Search
CPC ................. H04R 1/2884; H04R 1/026; H04R 2201/025; H04R 2201/029
(Continued)

(56) References Cited

U.S. PATENT DOCUMENTS 4,884,655 A    12/1989  Freadman et al.
5,178,357 A *  1/1993   Platus ..................... F16F 3/026
                                                          248/619
(Continued)

FOREIGN PATENT DOCUMENTS

EP    2165090 A1    3/2010
EP    2501982 A1    9/2012
(Continued)

OTHER PUBLICATIONS

International Search Report (PCT/ISA/210), issued in PCT/EP2023/083201, dated Mar. 21, 2024.
(Continued)

*Primary Examiner* — Todd M Epps
(74) *Attorney, Agent, or Firm* — NIXON & VANDERHYE

(57) ABSTRACT

A link includes an arm having first and second recess/apertures, receiving first and second bearings, respectively. The bearings are attachable to structures, allowing movement of one structure independently of the other. The recess/aperture has an inward facing surface, and the bearing has an outward facing surface, the inward and outward facing surfaces being substantially arcuate. An isolator includes a base and shell connected to but extending from the base. The shell has an aperture opposite the base. A support structure has one end in the shell. The connecting arm has a component thereon outside the shell whereby the connecting arm connects to a structure. Links are pivotally connected at one end to the shell and pivotally connected at the other end to the connecting arm. The connection between each link and the connecting arm is closer to the base than the connection between each link and the shell.

20 Claims, 30 Drawing Sheets

(58) Field of Classification Search
USPC .......................................................... 248/638
See application file for complete search history.

(56) References Cited

U.S. PATENT DOCUMENTS

| | | | |
|---|---|---|---|
| 6,422,544 B1 | 7/2002 | Ohlsson | |
| 7,640,868 B2 | 1/2010 | Morrison et al. | |
| 8,215,245 B2* | 7/2012 | Morrison | H04R 1/026 |
| | | | 211/151 |
| 9,423,000 B2* | 8/2016 | Tan | G01L 19/0061 |
| 9,860,630 B2* | 1/2018 | Strange | H04R 1/26 |
| 9,920,811 B1* | 3/2018 | Morrison | F16F 15/08 |
| 10,154,338 B2 | 12/2018 | Strange et al. | |
| 10,575,078 B2 | 2/2020 | Slaton | |
| 11,495,269 B2 | 11/2022 | Morrison | |
| 2017/0306851 A1* | 10/2017 | Jiang | F16F 15/02 |
| 2018/0073592 A1 | 3/2018 | Morrison | |
| 2022/0316550 A1* | 10/2022 | Jang | F16F 3/04 |

FOREIGN PATENT DOCUMENTS

| | | | |
|---|---|---|---|
| WO | 2008148190 A1 | 12/2008 | |
| WO | 2011060529 A1 | 5/2011 | |

OTHER PUBLICATIONS

Written Opinion of the International Searching Authority (PCT/ISA/237), issued in PCT/EP2023/083201, dated Mar. 21, 2024.

* cited by examiner

Section A-A

Section A-A

Half Section B

Section C-C

Section D-D

Section A-A

Section B-B

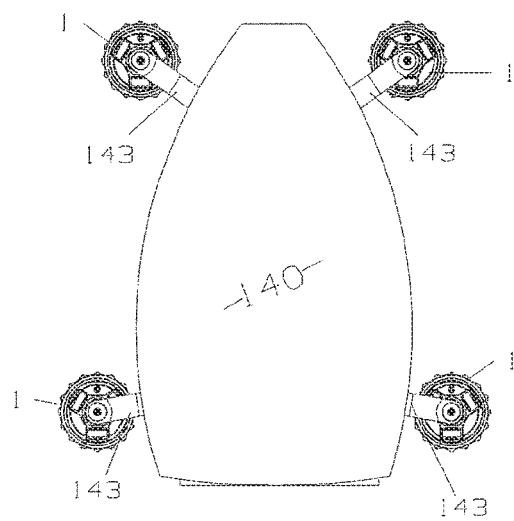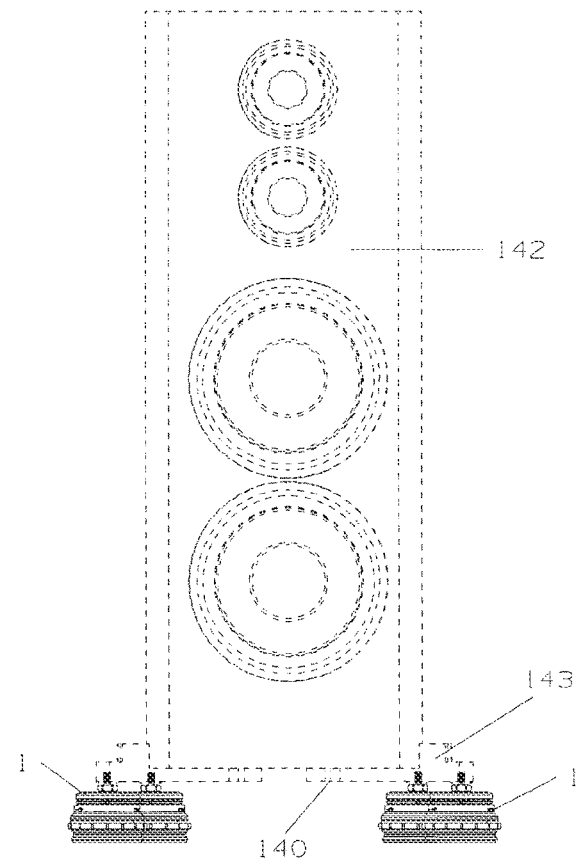
Figure 27
Figure 28

Section A-A

Half Section B

Section C-C

ISOLATOR AND/OR A LINK

CROSS-REFERENCE TO RELATED APPLICATIONS

This application claims priority to U.S. Provisional Patent Application Nos. 63/496,501 filed Apr. 17, 2023, and 63/596,742 filed Nov. 7, 2023, the entire contents of which are hereby incorporated by reference.

TECHNICAL FIELD OF THE INVENTION

This invention relates to an isolator and/or a link particularly but not solely for use in decoupling vibrations arising in sound speaker systems such as hi-fi speakers.

Throughout this specification the word "comprise" or variations such as "comprises" and "comprising" may be used. If used, these words will be understood to imply the inclusion of the stated element integer or step, but not the exclusion of any other element, integer or step, or group of elements, integers or steps.

Any discussion of documents, acts, materials, devices, articles or the like which has been included in this specification is not to be taken as an admission that any or all of these matters form part of the prior art base or were common general knowledge in the field relevant to the present disclosure as it existed before the priority date of the application to which this specification relates.

BACKGROUND OF INVENTION

In a sound speaker system such as a hi-fi system once the speaker such as a sound box, starts playing sound, such as music, various vibrational movements commence, such as the horizontal vibration caused by the movements of the speaker's drivers. These movements also create vibration and resonance to the surface material of the speaker cabinet, as well as vertical vibrations reflecting between the speaker and the supporting surface on which the speaker stands. The combination of these vibrations causes substantial distortion to the purpose of a hi-fi system, that is to say, the purity of sound. Similar issues can arise in other situations. This is disadvantageous.

It is therefore an object of the present invention to provide an isolator and/or a link which will obviate or minimize the foregoing disadvantages, or which will at least provide the public with a useful choice.

DISCLOSURE OF THE INVENTION

Accordingly in a first aspect the invention consists in a link comprising an arm having a first recess or aperture and a second recess or aperture, the first recess or aperture receiving a first bearing and the second recess or aperture receiving a second bearing, each bearing having attachment means so that in use the first bearing can be attached to a first structure and the second bearing can be attached to a second structure so as to allow movement of one structure substantially independently of the other structure over at least some distance, the recess or aperture having an inward facing surface and the bearing having an outward facing surface, the inward facing surface of the recess or aperture and the outward facing surface of the bearing being substantially arcuate.

Preferably the radius of curvature of each arc is substantially identical.

In a further aspect the invention consists in an isolator comprising a base, a shell extending from the base, the shell having an aperture substantially opposite the base, a connecting arm having one end positioned within the shell, the connecting arm having means thereon whereby the connecting arm may be connectable to a structure, and a plurality of links, each link being pivotally connected at or adjacent one end to the shell and being pivotally connected at or adjacent the other end to the connecting arm, the connection between each link and the connecting arm being closer to the base than the connection between each link and the shell.

Preferably the connection between each link and the shell is adjacent the aperture in the shell.

Preferably each connection between the link and the shell and between each link and the connecting arm allows pivotal movement in the plane of the link and rotational movement about the axis of the link.

Preferably three links are provided spaced substantially equidistantly about the shell.

Preferably the base is connected to the shell in a manner which allows adjustment between the base and the shell.

Preferably the connecting arm extends outwardly through the aperture in the shell.

In a still further aspect, the invention consists in an isolator according to any one of the preceding paragraphs mounted between a sound speaker and a supporting surface.

The scope of the invention is as claimed in the claims herein but where specific integers are mentioned and/or claimed herein which have known equivalents in the art to which this invention relates, such known equivalents are deemed to be incorporated and/or claimed herein as if individually set forth.

The invention consists in the foregoing and also envisages constructions of which the following gives examples.

BRIEF DESCRIPTION OF DRAWINGS

Embodiments of the invention are described hereinafter with references to the drawings, in which:

FIG. 27 is a plan view of an audio loudspeaker isolator using isolators according to a preferred form of the invention, FIG. 28 is a front elevation of the audio loudspeaker isolator of FIG. 27 in use.

DETAILED DESCRIPTION OF THE EMBODIMENTS

Figure 1:
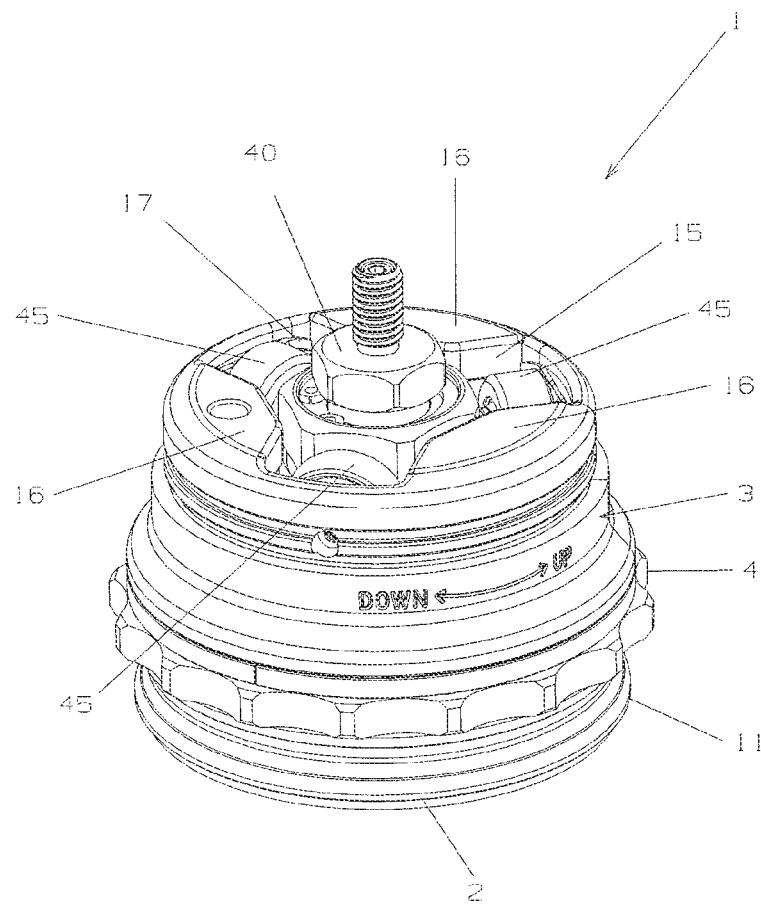
FIG. 1 is a perspective view of an isolator according to a preferred form of the invention.
Figure 2:
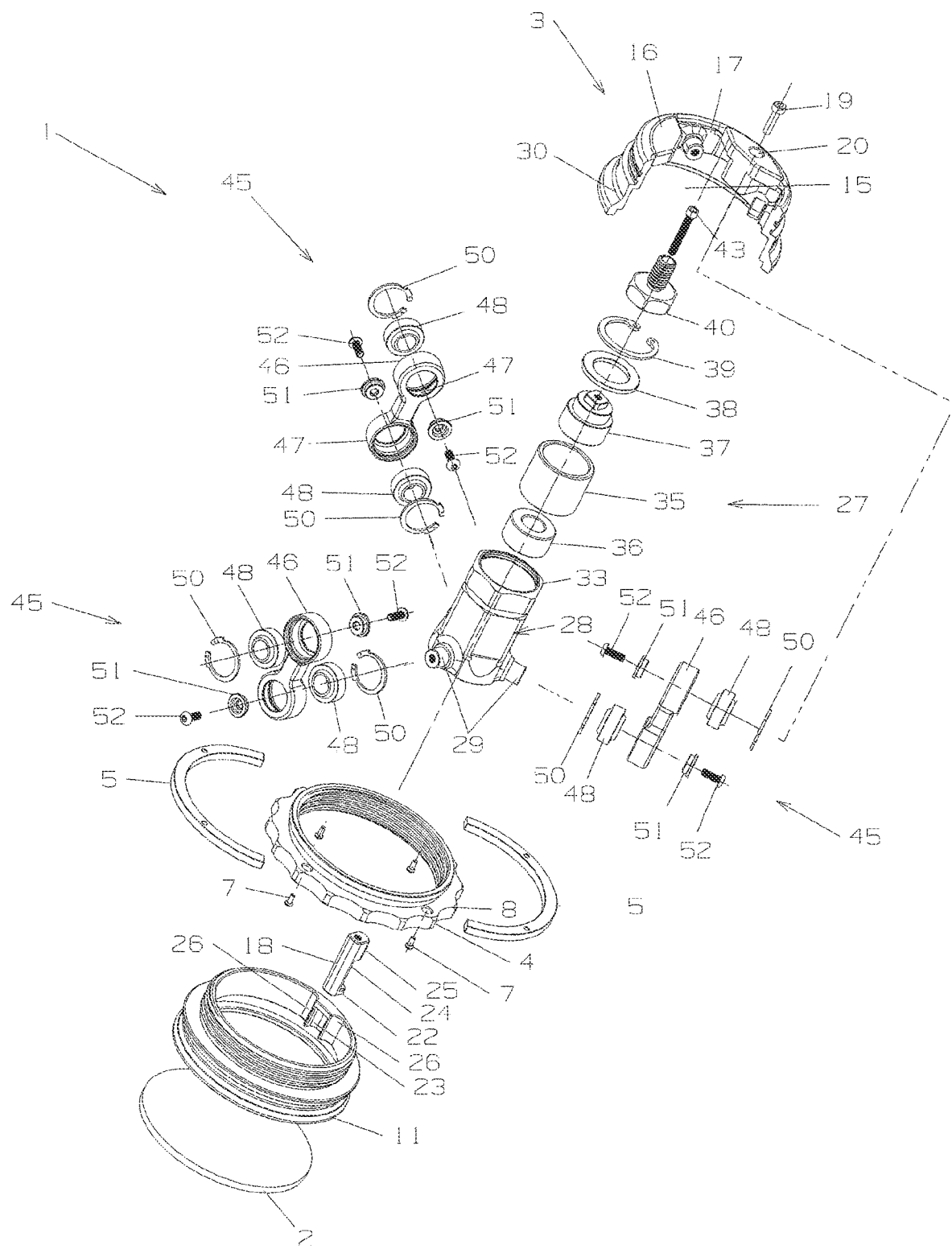
FIG. 2 is an exploded view of an isolator as shown in FIG. 1.
Figure 3:
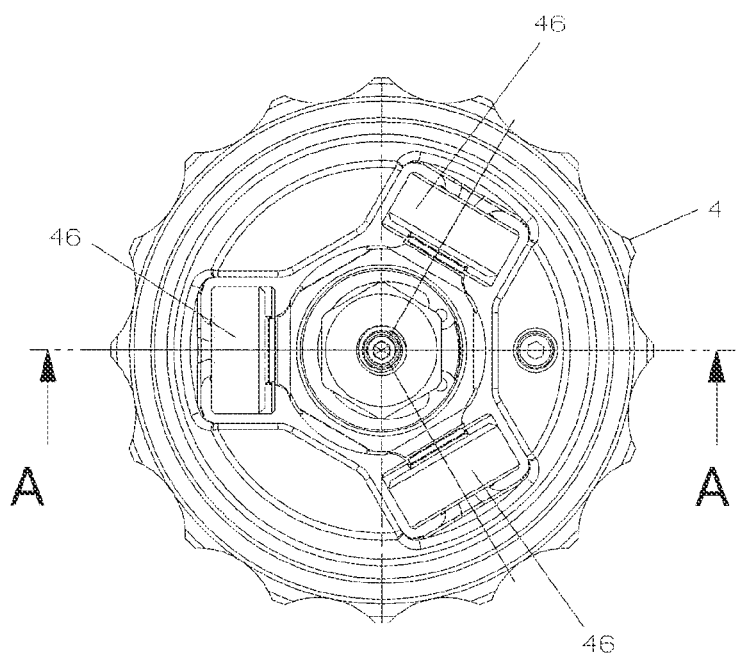
FIG. 3 is a plan view of an isolator according to a preferred form of the invention.

Where terms such as upper and lower or similar are used in the following description they relate to the orientation seen in the drawings.

Referring to the drawings, an isolator 1 is provided. The isolator 1 is intended to be used with at least four different product lines: loudspeaker decoupling feet, audio component feet, computer/bookshelf speaker podium, and audio rack.

The isolator 1 has a base 2 which is desirably formed from a resilient material such as rubber or a similar plastics material so as to reduce the possibility of the base sliding on the material or structure on which it stands.

Attached to the base 2 is a shell 3. The shell 3 is attached to the base 2 through an adjustment mechanism. The adjustment mechanism comprises a first ring 4 which is threaded on its inwardly facing surface. The first ring 4 is engaged with the shell 3 by means of two semi-circular members 5 which engage under lip 6 (FIG. 4) on first ring 4 and are secured to the shell 3 by means of screws 7 passing fully through apertures 8 in the first ring 4 and engaging into threaded sockets 9 in the shell 3 with the head of the screw 7 being held in engagement with the semi-circular members 5 by means of stepped untreaded apertures 10 through the semi-circular members 5. Thus first ring 4 is held to the shell 3 but is free to turn relative to the shell 3.

A second ring 11 is provided which has threads on its outwardly facing surface, which threads engage with the threads on the first ring 4. The second ring 11 is held against rotation (as will be described later herein) so that rotation of first ring 4 will cause the second ring 11 to extend or retract relative to the shell 3 depending on the direction of rotation of the first ring 4.

The base 2 is connected to the second ring 11 in any desired manner, such as by gluing.

A support device is provided to enable the isolator to be connected to or to support a structure such as a speaker or sound box.

The shell 3 has an aperture 15 at the end of the isolator 1 opposite the base 2. Aperture 15 has inwardly extending protrusions 16, such as three protrusions 16, providing recesses 17 therebetween. A guide 18 is provided which is held to the shell 3 by a screw 19 (FIG. 4) passing into a stepped aperture 20 and engaging into a threaded recess 21 in the adjacent end of the guide 18. At the other end of guide 18 is a lobe 22 which engages in slot 23 in the inner surface of the ring 10. The lobe 22 can move longitudinally in the slot 23 but the location of the lobe 22 in the slot 23 prevents rotational movement of the shell 3 with respect to the second ring 11, The threaded recess 21 is proved in the upper end 25 of the guide 18 preferably on a lobe 24 extending outwardly from the stem of the guide 18 in the same direction but spaced from the lobe 22. The guide 18 is positioned between two inwardly extending ribs 26 extending inwardly from the second ring 11.

In this embodiment of the invention the support structure includes a connecting arm 27. The connecting arm 27 has one end positioned within the shell 3 and the other end preferably extends out through the aperture 15 to enable the connecting arm 27 to be engaged with a structure such as a hi-fi speaker connection.

The connecting arm 27 may be constructed as follows. Within the shell 3 is positioned a centre pendulum member 28 which has several spigots 29, such as three spigots 29 extending substantially equidistantly outwardly substantially at a right angle to the longitudinal axis of the pendulum member 28. Similar spigots 30 are provided in the recesses 17 in the shell 3. The spigots 30 extend inwardly again substantially at right angles to the longitudinal axis of the shell 3.

Figure 4:
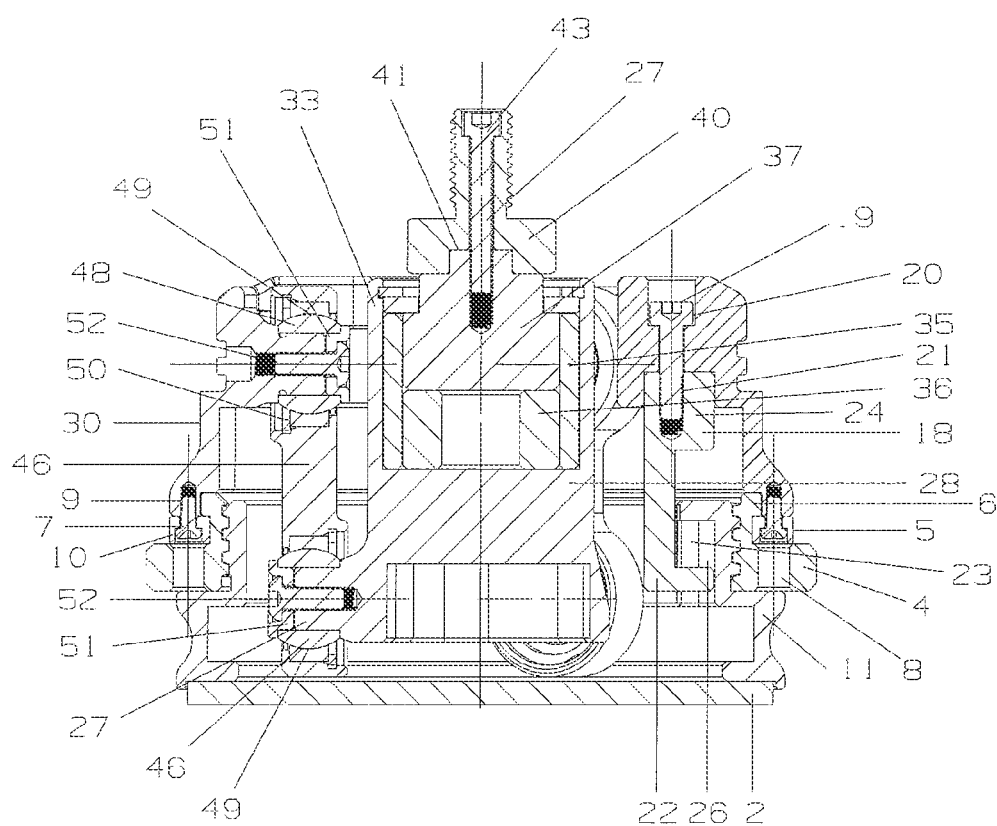
FIG. 4 is a cross-sectional drawing on "A-A" in FIG. 3 of an isolator according to a preferred form of the invention.
Figure 5:
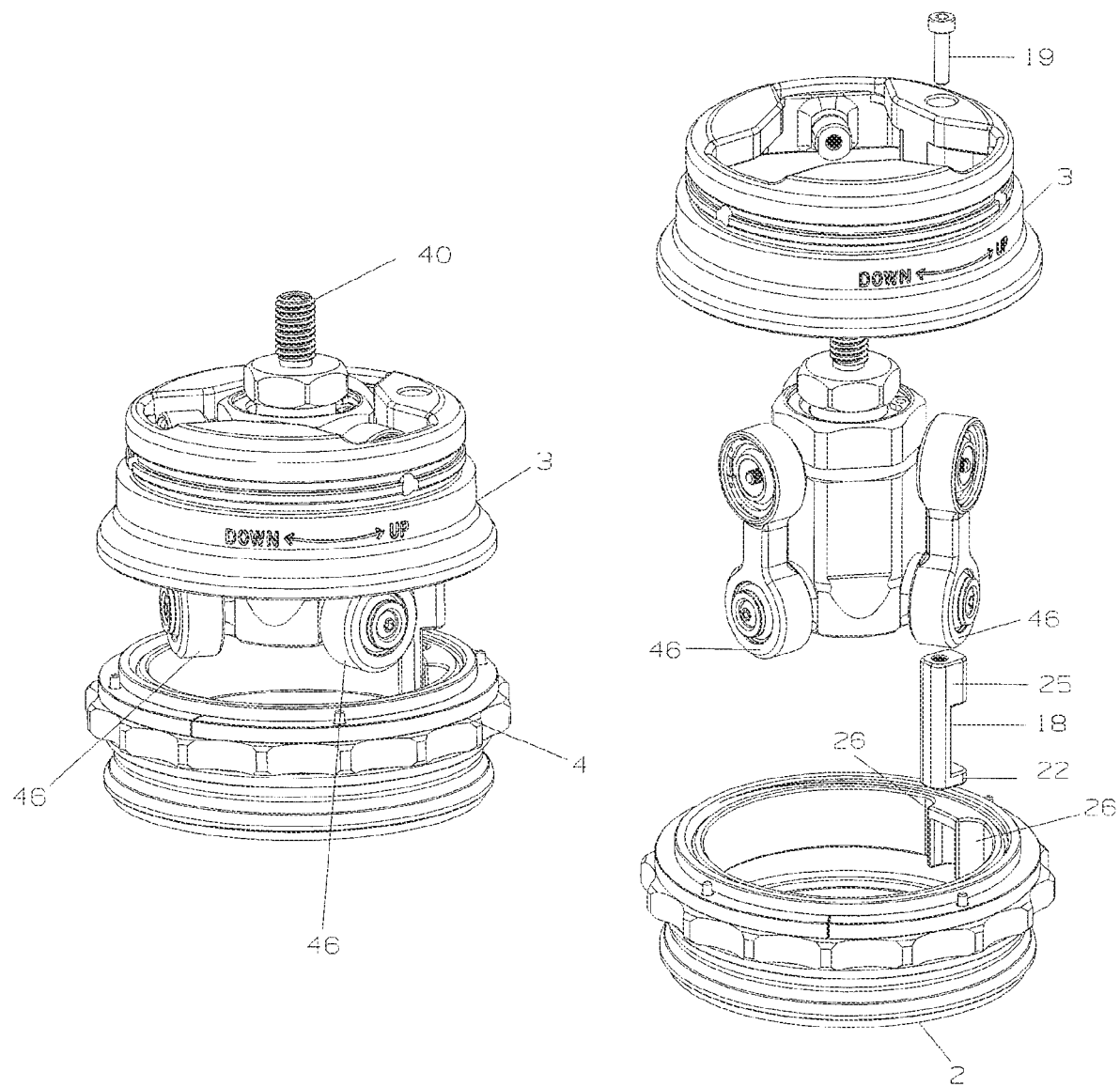
FIG. 5 is two partially exploded views of an isolator according to a preferred form of the invention.

The other end of the pendulum member 28 has a recess therein which is circular in cross-section and into which is placed an isolating member 35 in the form of a tubular member. Within the isolating member 35 is a further shorter tubular member 36. The shorter tubular member 36 is formed of metal and the isolating member 35 is formed of a softer cushioning material between the metal pendulum member 28 and the metal shorter tubular 36. The isolating member 35 and the shorter tubular member 36 are held in place by a support member 37 which is positioned within the upper part 33 of the pendulum member 28. The support member 37 is held in position by a washer 38 and a first circlip 39 which both sit on the end of isolating member 35 and in a rebate in the support member 37 as can be seen in FIG. 4. The first circlip 39 is also clipped into a recess in the inner wall of member 33. This holds the isolating member 35 and the support member 37 in engagement with the pendulum member 28.

The connecting arm 27 further has a connecting bolt 40 thereon to enable the connecting arm 27 to be engaged with a structure such as a hi-fi speaker connection in use. The connecting bolt 40 has a longitudinal stepped aperture through which a bolt 43 passes to be secured in a threaded recess in the support member 37 which is best seen in FIG. 4.

Links 45 are provided between the connecting arm 27 and the shell 3. In simple terms each link 45 comprises an arm 46 with an aperture 47 at each end. One end of each link 45 being rotationally attached to the connecting arm 27 and the other end rotationally attached to the shell 3.

In the preferred form of the invention three links 45 are provided. Each link 45 comprises an arm 46 having a recess or stepped aperture 47 at each end. Into each aperture 47 is positioned a bearing 48, an outwardly facing face 49 of which is arcuate. Where the bearing 48 touches the stepped aperture then desirably the contact face is shaped to match the arcuate surface 49. The bearings 48 are held in position by a second circlip 50, a stepped washer 51 and a screw or bolt 52 which passes through the stepped washer 51, the second circlip 50, and bearing 48 into a receiving threaded recess in either spigot 29 or 30. The effect is that the links can swing on each spigot 29 and 30 and because of the arcuate surfaces 49 can also tilt. This provides a wide range of movement for the links relative to the connecting arm 27 and the shell 3. This means that the connecting arm 27 has a wide range of movement relative to the shell 3. These degrees of freedom about the central member 28 allow improved dynamics of sound from the speaker.

In use, the connecting bolt 40 is attached to a structure such as a loudspeaker, and the base 2 is placed on a supporting surface. There may be any suitable number of isolators according to the invention used to support a structure but usually there would be three or four. The first ring 4 can be rotated where necessary to adjust levelling where the supporting surface is not level.

When vibrations occur in the structure these are eliminated or at least reduced by the relative movement between the connecting arm 27 and shell 3.

Figure 6:
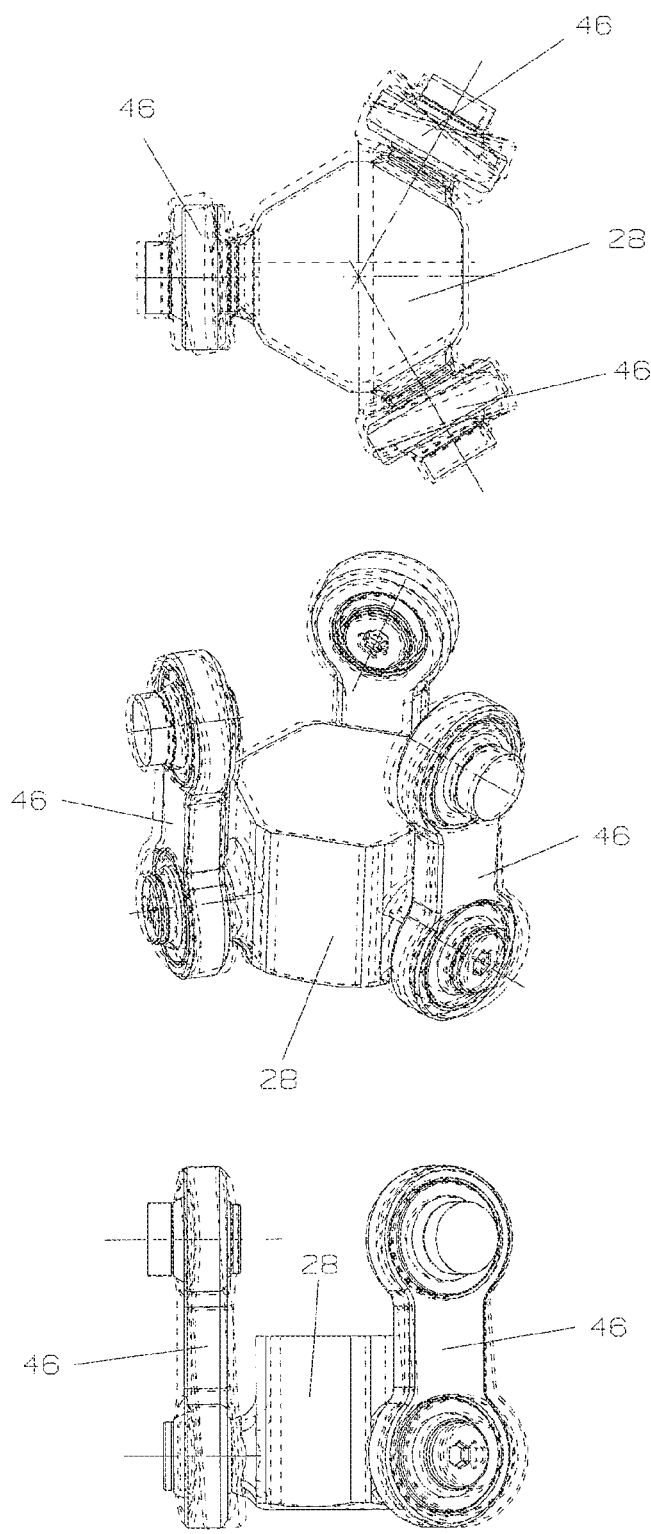
FIG. 6 is respectively plan and perspective views and a side elevation of part of an isolator according to the invention showing the movement of the parts in dashed outline.
Figure 7:
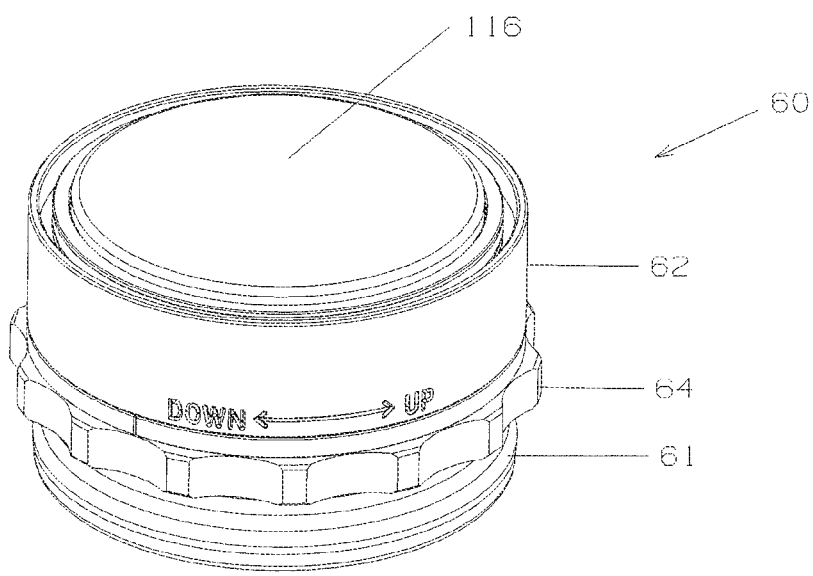
FIG. 7 is a perspective view of an alternative isolator according to a further preferred form of the invention.
Figure 8:
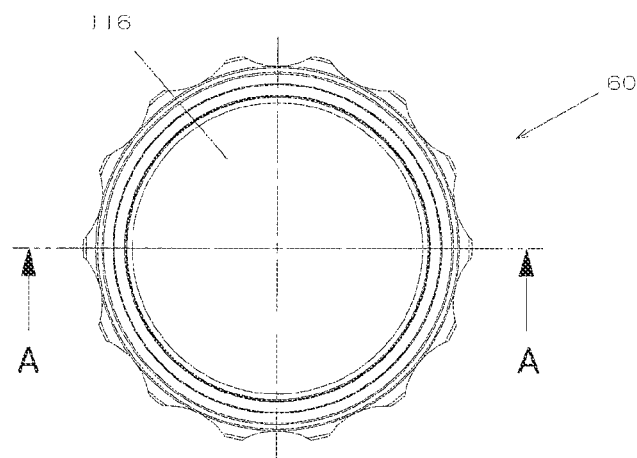
FIG. 8 is a plan view of the isolator of FIG. 7.
Figure 9:
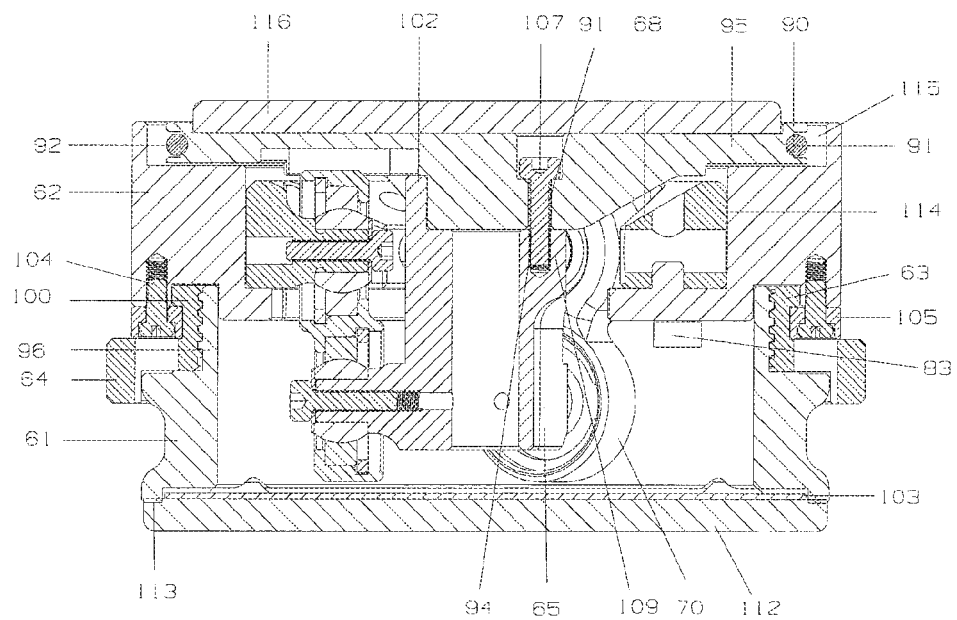
FIG. 9 is a cross section on 'A-A' in FIG. 8.
Figure 10:
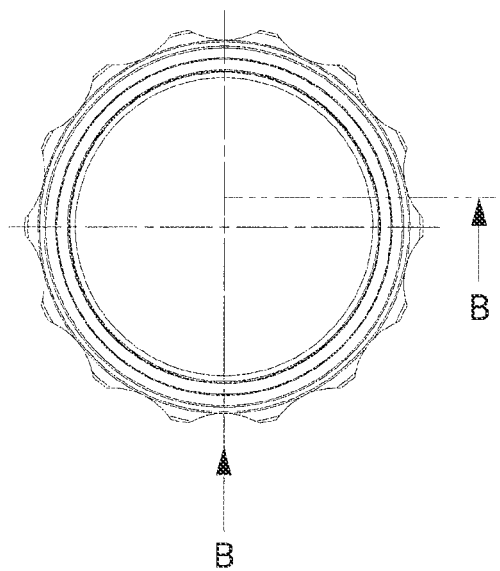
FIG. 10 is a view as for FIG. 8 showing the position of an alternative cross-section 'B-B'.
Figure 11:
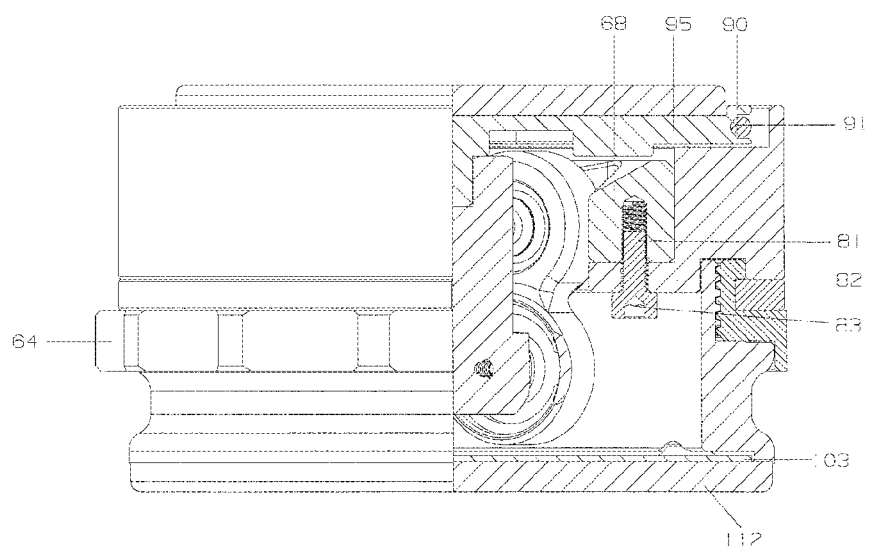
FIG. 11 is a half section on 'B-B' in FIG. 10.
Figure 12:
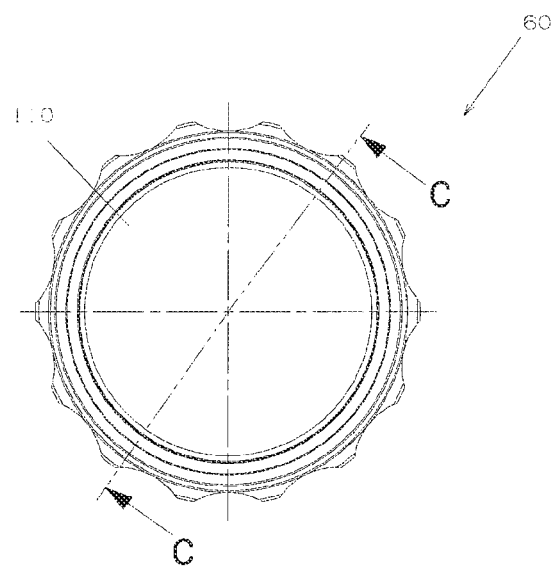
FIG. 12 is a view as for FIG. 8 showing the position of an alternative cross-section 'C-C'.
Figure 13:
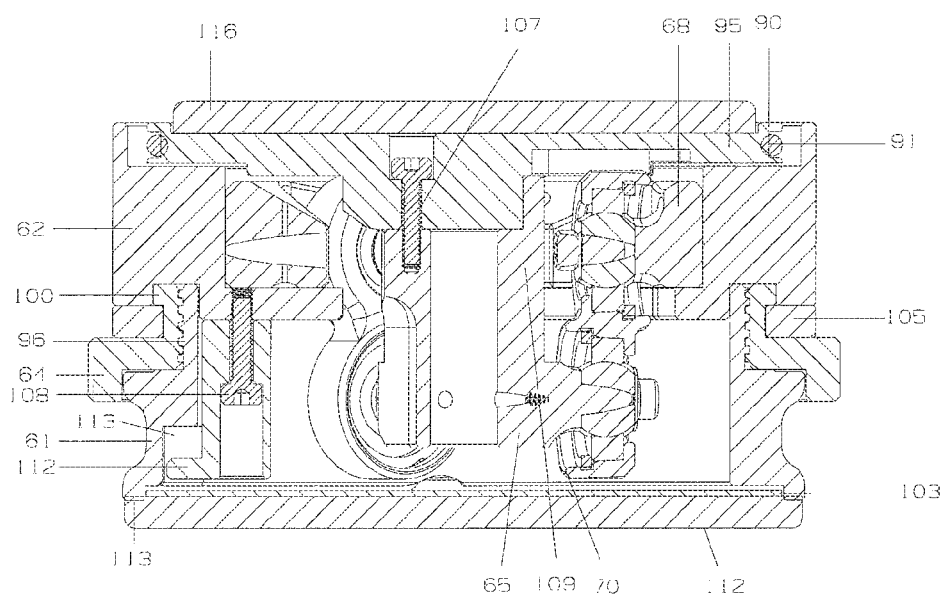
FIG. 13 is a cross section on 'C-C' in FIG. 12.
Figure 14:
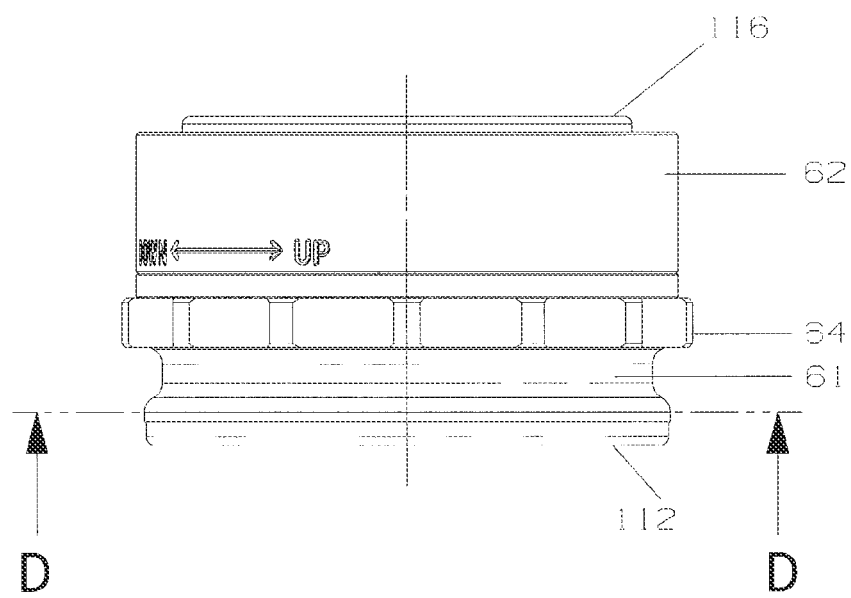
FIG. 14 is a side elevation of the isolator of FIG. 7.
Figure 15:
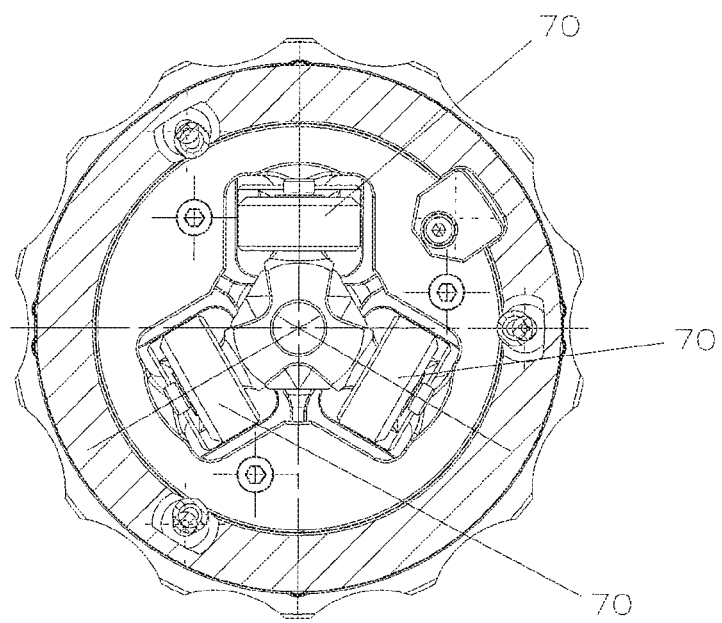
FIG. 15 is a cross section on 'D-D' in FIG. 14.
Figures 16, 17:
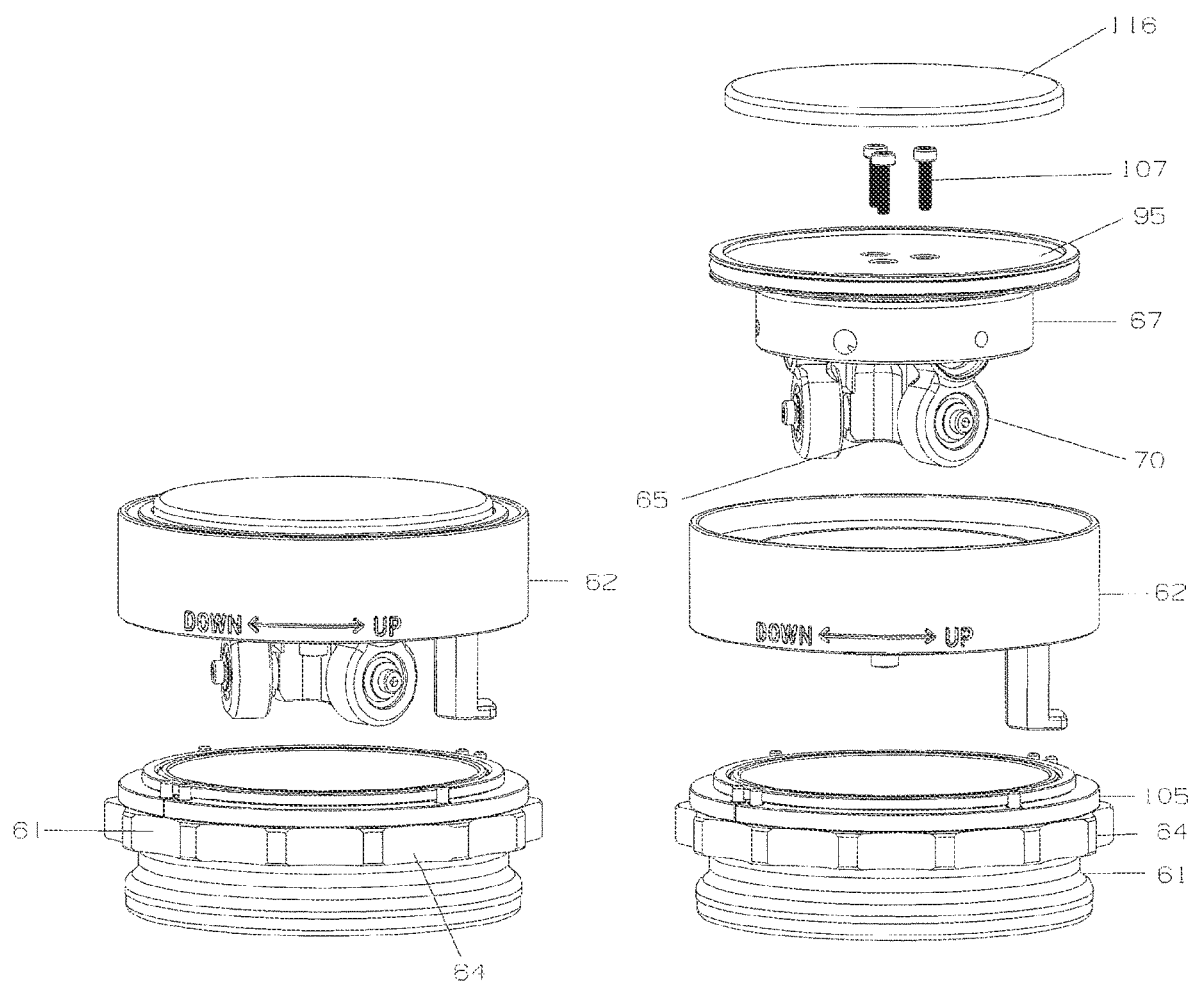
FIG. 16 is a partly exploded perspective view of the isolator of FIG. 7.
FIG. 17 is a further partly exploded view of the isolator of FIG. 7.
Figure 18:
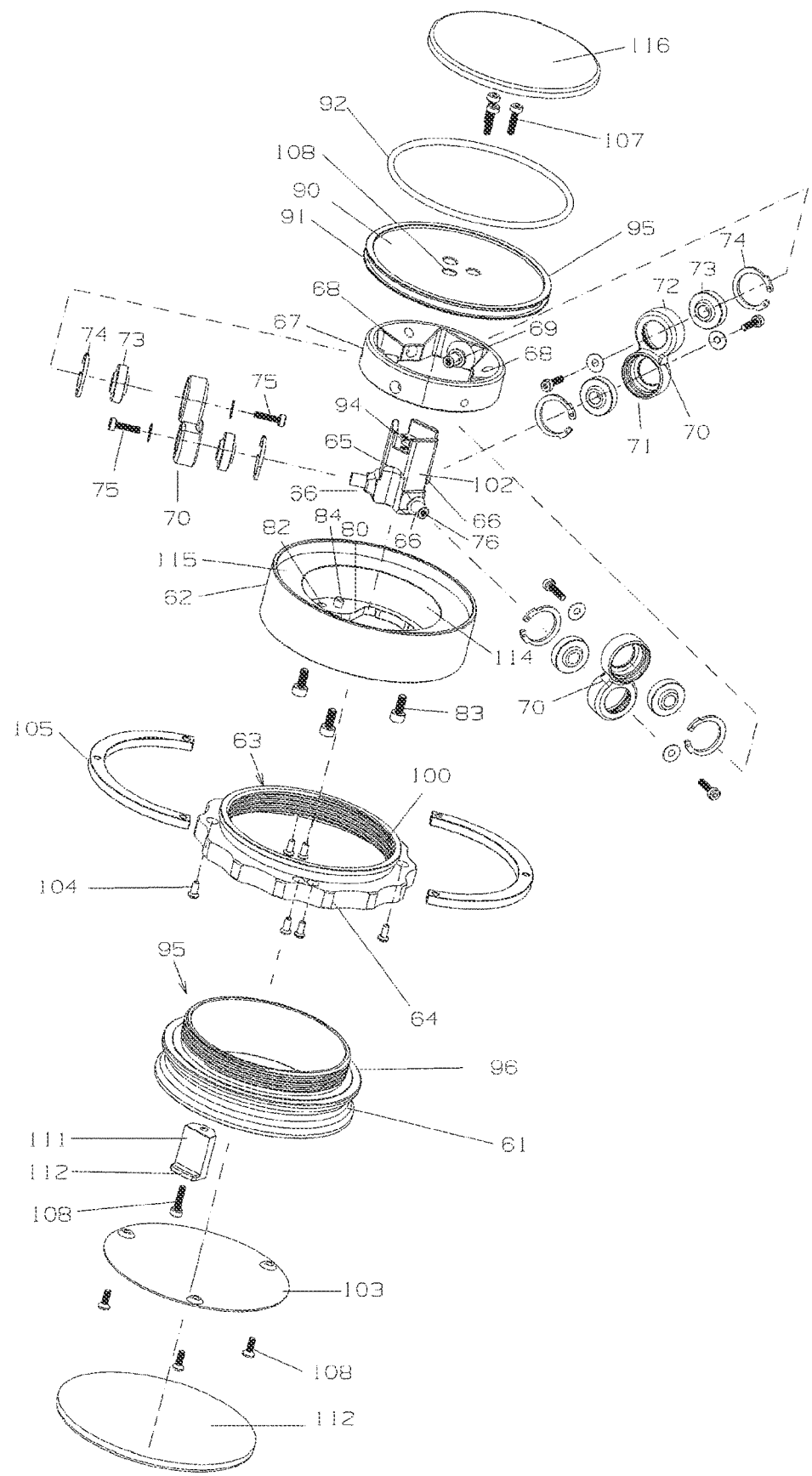
FIG. 18 is an exploded view of the isolator of FIG. 7, FIG. 19 perspective view of a computer bookshelf speaker podium according to a further preferred embodiment of the invention showing a schematic computer/bookshelf speaker in dashed outline.
Figure 19:
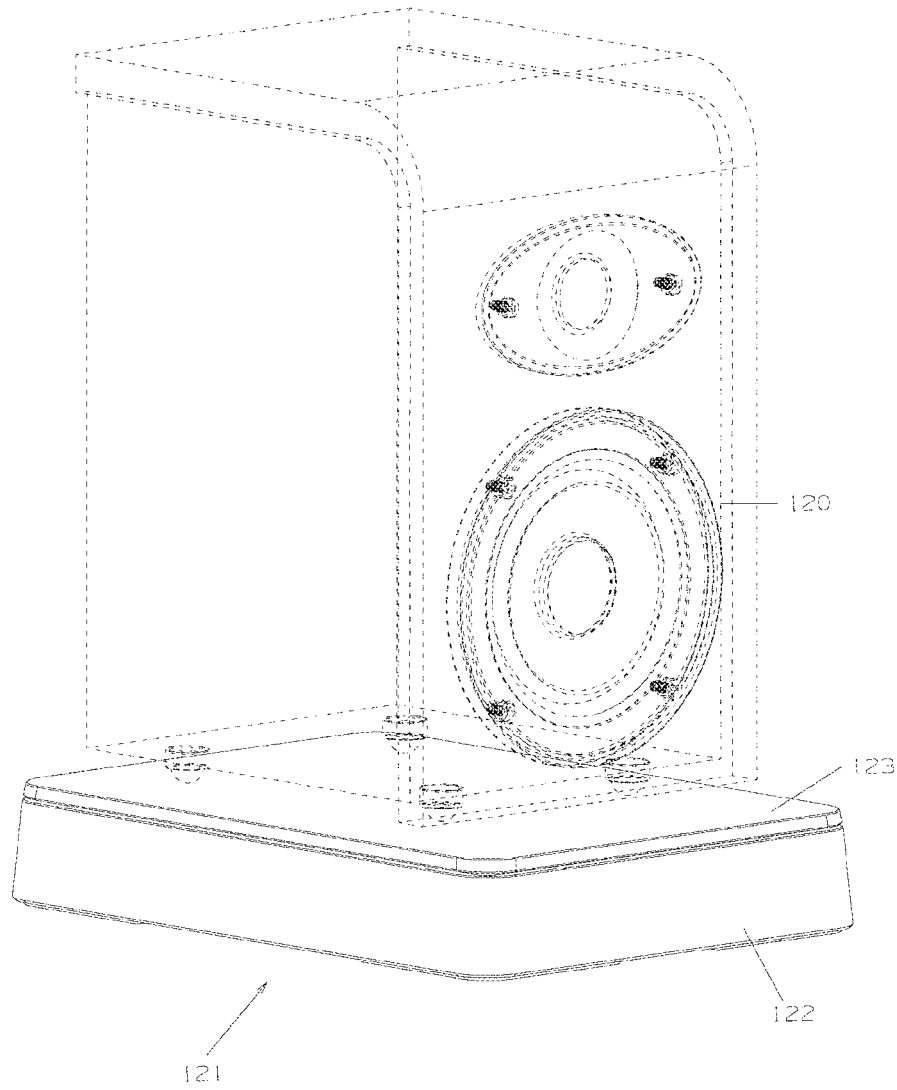
Figure 20:
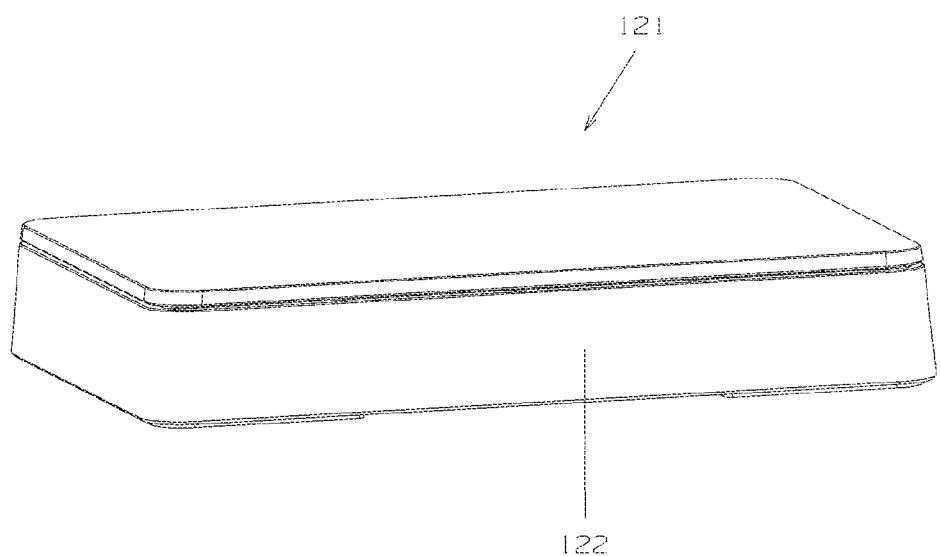
FIG. 20 is a perspective view of the computer bookshelf speaker podium of FIG. 19.

Turning now to FIG. 6 each link 45 is able to move over a range indicated by the dashed lines. In view of the use of three arms and the arcuate surfaces on the inward facing faces of the stepped apertures 47 and the outward facing faces 49 of the bearings 48 movement in any direction that the arms 46 can swing.

In FIGS. 7 to 18 an alternative isolator 60 is provided which is a simplified version of the isolator 1 shown in FIGS. 1 to 6. The isolator 60 has a base part 61 and a cover or shell which includes a cover part 62. A mechanism is provided to allow the base part 61 and cover part 62 to be rotated one relative to the other to expand or contract the isolator 60. In the embodiment shown a ring member 63 is provided with finger grips 64 around its outwardly facing face.

Within the base part 61 and cover part 62 is provided a pendulum member 65 which has a number, preferably three, spigots 66 extending outwardly therefrom. The spigots 66 are equally spaced around the pendulum member 65. The pendulum member 65 sits inside or a little below an annular member 67 which has three inwardly extending protrusions 68 and three inwardly extending spigots 69. As in the previous embodiment a link 70 is provided with opposed stepped apertures 71 and 72 which each receive a bearing 73 which is held in place by a circlip 74 able to be 'snapped' into a groove in the inwardly facing face of the aperture 71 or 72. Each spigot 66 or 69 has a central threaded recess 76 which enables a screw 75 to be passed through the bearing 73 to held in the threaded recess 76. Thus, each link 70 can freely swing on the spigots 66 and 69. The inwardly extending protrusions 68 slope downwardly inwardly. Again the outer surface of the bearing 73 and its receiving recess in the link 70 are arcuate.

The cover part 62 is also substantially annular with inward protrusions 80. The inward protrusions 80 match the inwardly extending protrusions 68 on the annular member 67. The underside of the inwardly extending protrusions 68 have threaded recesses 81 and the inward protrusions 80 have apertures 82 so that bolts 83 may pass through apertures 82 and be secured into the threaded recesses 81. The inward protrusions 80 also carry a pin 84 which becomes positioned in an aperture 85 in inwardly extending protrusions 68.

A disc 90 is provided which has a circumferential groove 91 on the outwardly facing surface thereof into which an "O-ring" 92 is positioned. The disc 90 is secured to the pendulum member 65 by bolts 107 which pass through apertures 107' in the disc 90 and into threaded receiving apertures or depressions 94 in the pendulum member 65. The "O-ring" 92 substantially prevents direct contact between the disc 90 and the cover part 62.

A threaded height adjustment member 95 is provided which is threaded on its outer surface at threads 96. The threads 96 are engaged by threads 100 on the ring member 63.

The pendulum member 65 has three upstanding ridges 102 at its upper end. The cover part 62 has a downwardly depending arm 111 which is centrally apertured and threaded to receive a bolt 108 to position the the base part 61 and the cover part 62 but allow rotation therebetween. The downwardly depending arm 111 has an outwardly extending flange 111' which in the assembled construction becomes positioned in a rebate 113'.

Semi-circular members 105 are provided which are secured to cover part 62 in the same manner as semi-circular members 5 in the construction of FIGS. 1 to 6. Bolts 104 are provided to secure the semi-circular members 105 to the ring member 63.

The annular member 67 is engaged with the cover part 62 by engagement into a rebate 114 in the cover part 62 and the disc 90 is positioned in a rebate 115 also in the cover part 62. Further disc 116 constructed of a non-slip material is then positioned in a rebate in the upper surface of the disc 90.

Similarly, a bottom cover plate 112, which is also desirably constructed of a "non-skid" rubber or plastics material is engaged into a rebate 113 but stands proud therefrom. A further disc 104 is positioned above the bottom cover plate 112 to provide additional support for the bottom cover plate 112.

The use of this embodiment of the invention is to decouple two structures, as for the previous embodiment but allows the isolator to be stood on one structure and to receive the other structure thereon. It is envisaged that usually three or four isolators according to this form of the invention would be used.

FIGS. 19 to 25 show a still further embodiment of the invention. This embodiment allows a speaker or other device such as a computer/bookshelf speaker to sit on a podium whilst still having isolation from a structure on which the speaker or other device would have sat.

Figure 21:
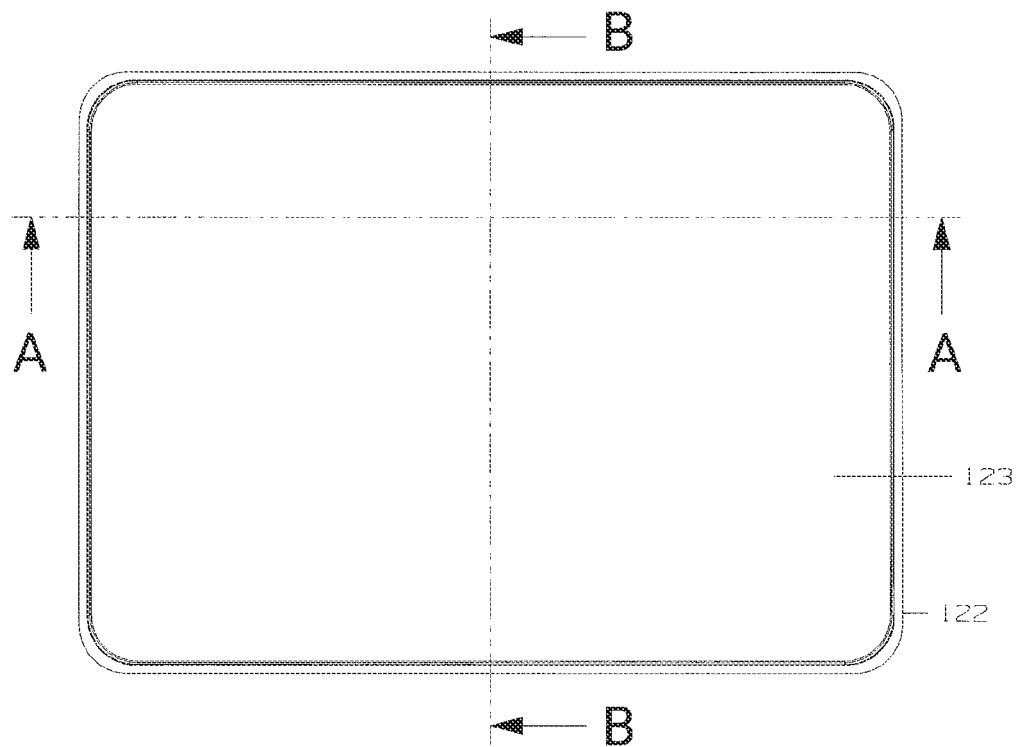
FIG. 21 is a plan view of the computer bookshelf speaker podium of FIG. 19.
Figure 22:
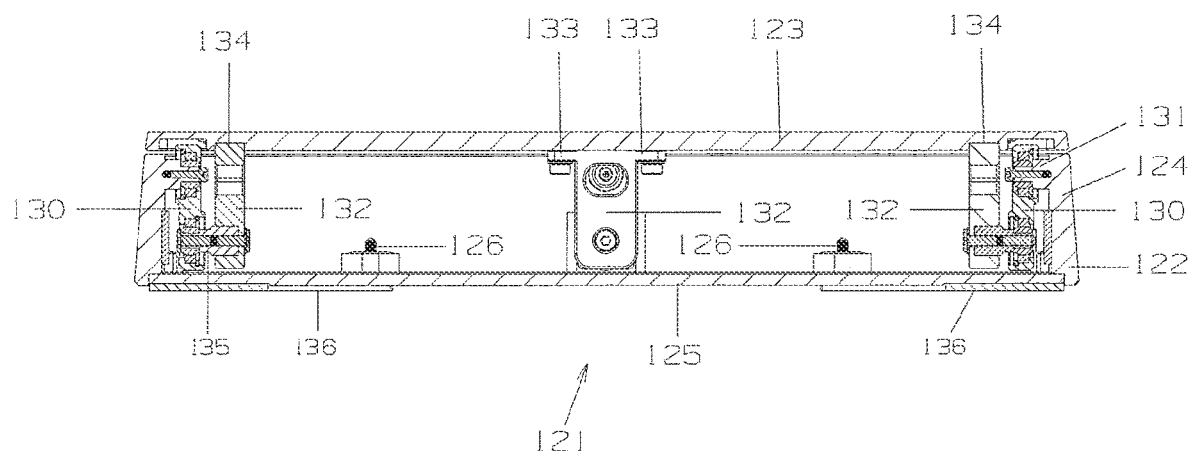
FIG. 22 is a cross section on 'A-A' in FIG. 21.
Figure 23:
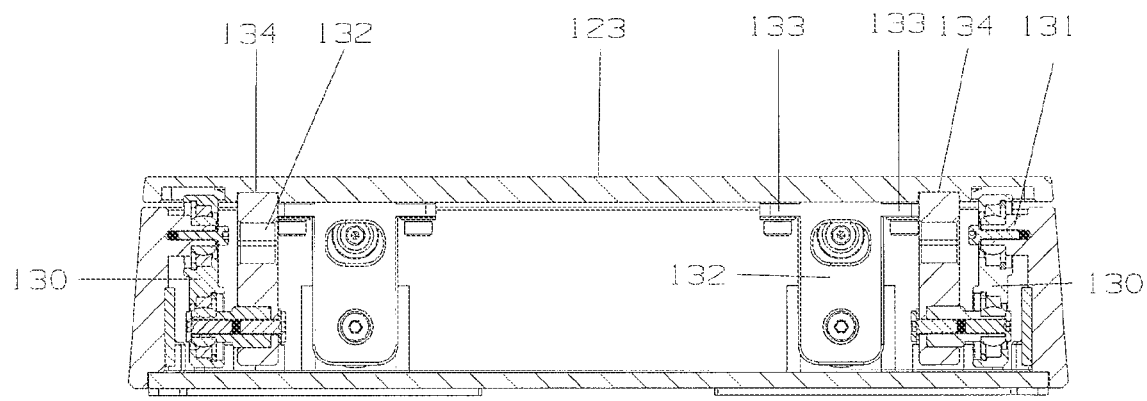
FIG. 23 is a cross section on 'B-B' in FIG. 21.
Figure 24:
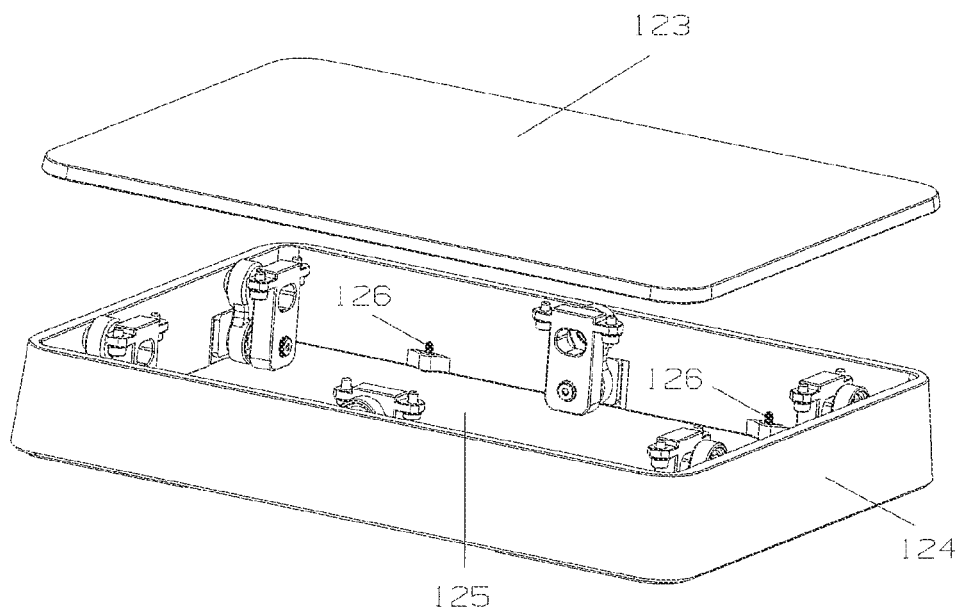
FIG. 24 is a partly exploded perspective view of the computer bookshelf speaker podium of FIG. 19.
Figure 25:
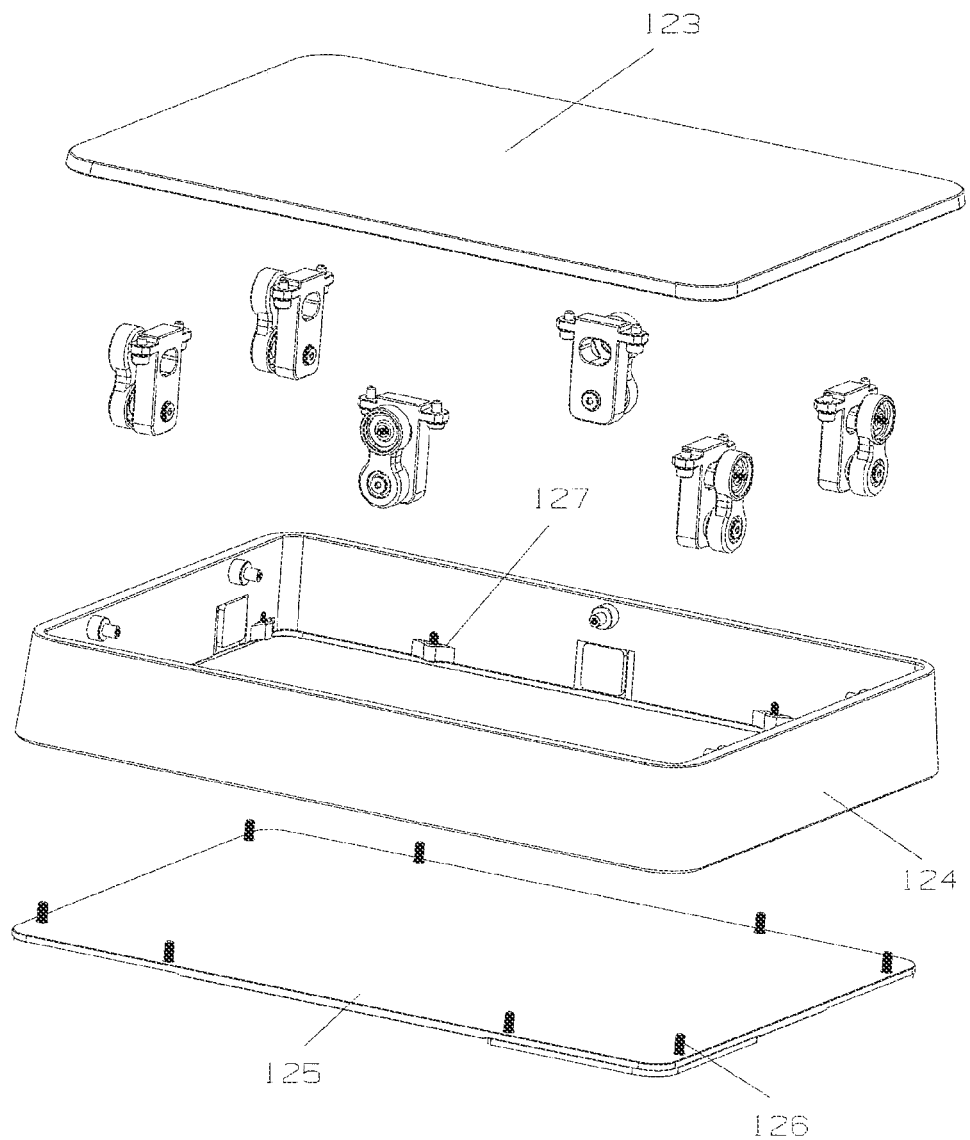
FIG. 25 is an exploded perspective view of the computer bookshelf speaker podium of FIG. 19.

A device 120 is able to sit on a podium 121. The podium 121 comprises a base 122 and a movable upper plate 123. The base 122 may be formed from a peripheral upstand member 124 and a bottom plate 125. The bottom plate 125 has several pins 126. Eight are shown in FIG. 21. The pins 126 are engaged into receiving apertured members 127.

The upper plate 123 is connected to the peripheral member 124 as follows. A number of links 130 are provided, there being six shown in FIG. 21. These will not be described in detail as they are essentially similar to the links described in the previous embodiments. The upper end of each link 130 is pivotally connected to a spigot 131 extending from the peripheral member 124. The lower end of each link 130 is connected to the upper plate 123. This is achieved by providing a downwardly depending arm 132 from the underside of the upper plate 123. The downwardly depending arms 132 may be constructed as part of the upper plate 123 or as a separate arm fixed to the underside of the upper plate 123 as in the embodiment illustrated and described herein. Thus, each downwardly depending arm 132 has a flange 133 each side of the arm which can be bolted to the underside of the upper plate 123. The upper end of the downwardly depending arm 132 is positioned in a notch 134 in the underside of the upper plate 123.

The link 130 is mounted pivotally on a spigot 135 extending from the downwardly depending arm 132. Thus, the pivotal movement of the downwardly depending arms 132 together with the arcuate facing surfaces of the bearings and the recess into which the bearings fit allows the upper plate 123 to be substantially isolated from the base 122.

Non-skid panels 136 are provided on the underside of the bottom plate 125.

In use in this embodiment a device such as a speaker can be placed onto the upper plate 123 so that movements of the device are substantially isolated from the base 122.

Figure 26:
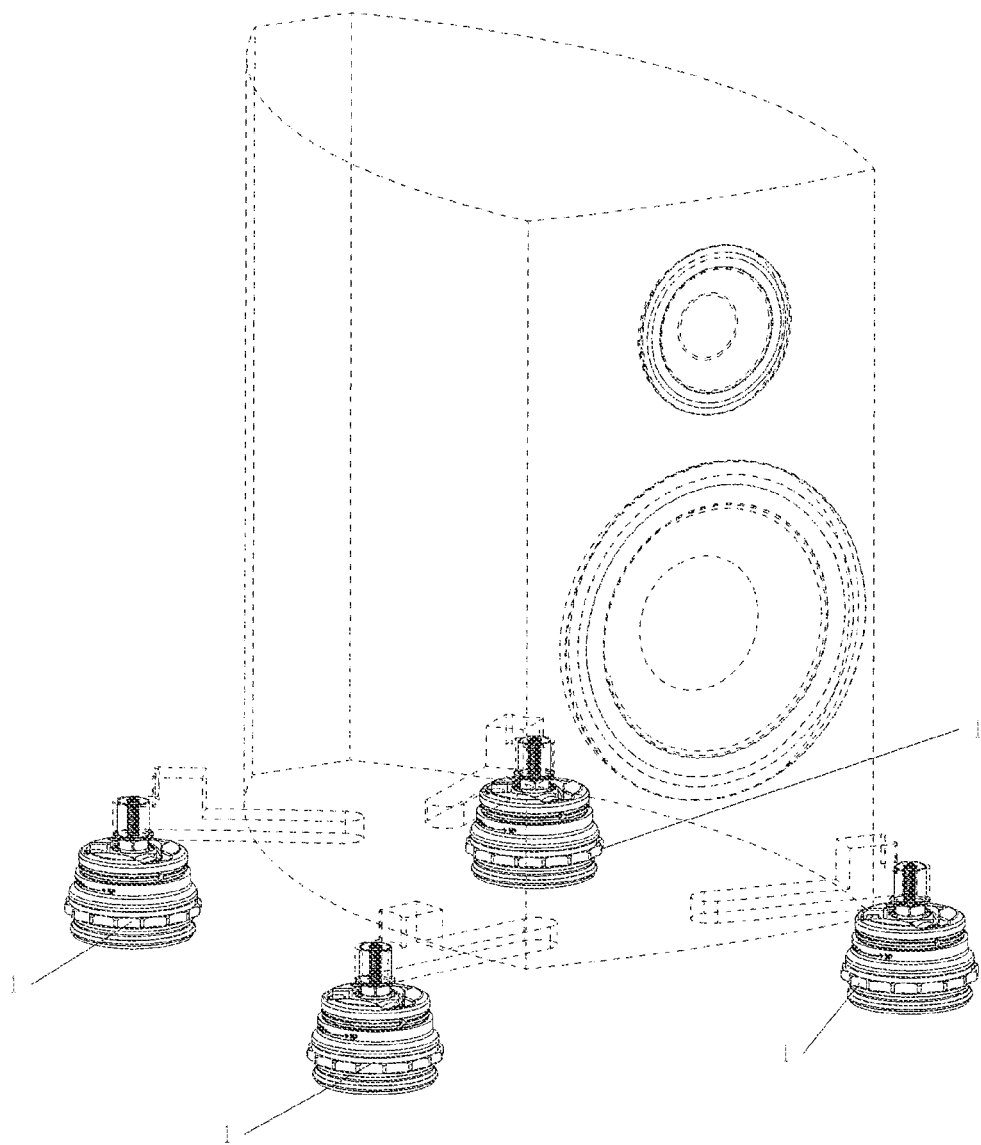
FIG. 26 is a perspective diagrammatic view of the isolators of FIG. 1 in use.
Figure 29:
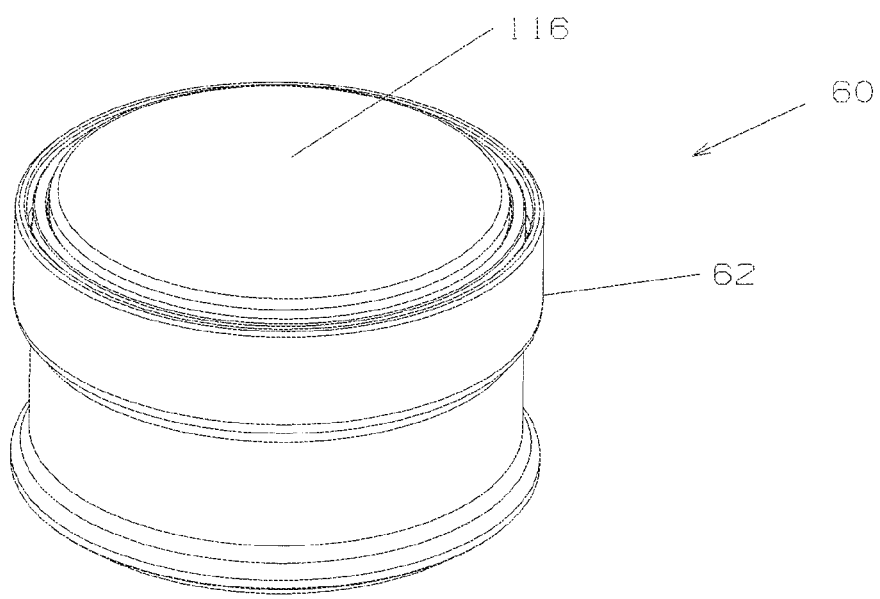
FIG. 29 is a perspective view of a still further isolator according to a further preferred embodiment of the invention.
Figure 30:
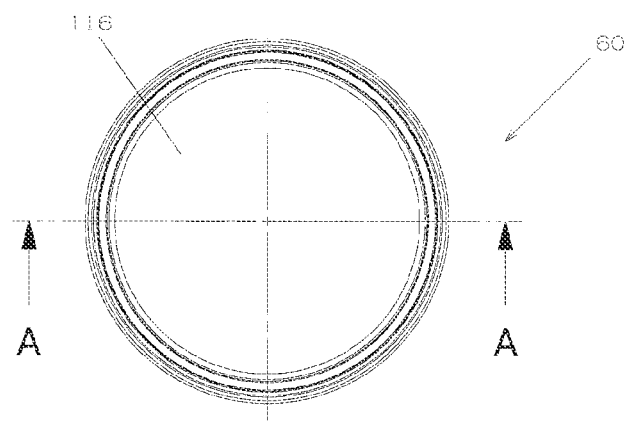
FIG. 30 is a plan view of the isolator of FIG. 29.

FIG. 26 shows the construction of the first described embodiment of the invention in use. Four isolators 1 are shown engaged with the underside of a speaker box to provide substantial isolation of the speaker cabinet from the supporting surface on which the isolators are placed.

FIGS. 27 and 28 show an alternative method of achieving isolation between a device and a support surface. A substantially rigid plate 140 is provided upon which a device 142 such as a speaker box can be placed. Extending outwardly from the rigid plate 140 are a plurality of arms 143. In the figures four such arms are shown. Attached to each arm 142 is an isolator. In the drawings the isolator is that described in the first embodiment herein.

In use the isolators 1 are attached to the rigid plate 140 and the height of each isolator is adjusted to achieve a stable platform. A device such as speaker box 142 can then be placed on the rigid plate 140 where the construction provides substantial physical separation against movement between the device 142 and the surface on which the isolators 1 sit in use.

Figure 31:
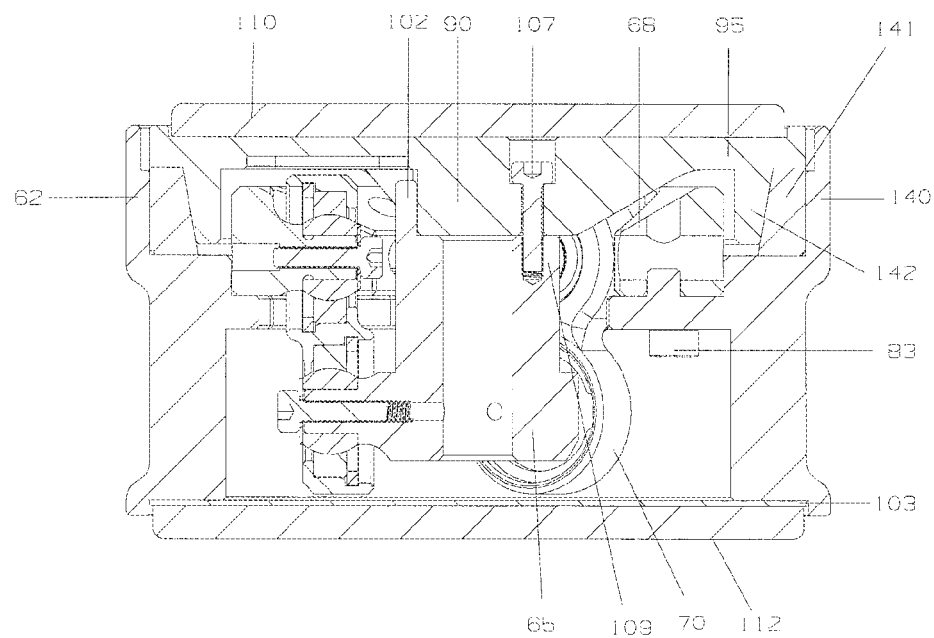
FIG. 31 is a cross section on 'A-A' in FIG. 30.
Figure 32:
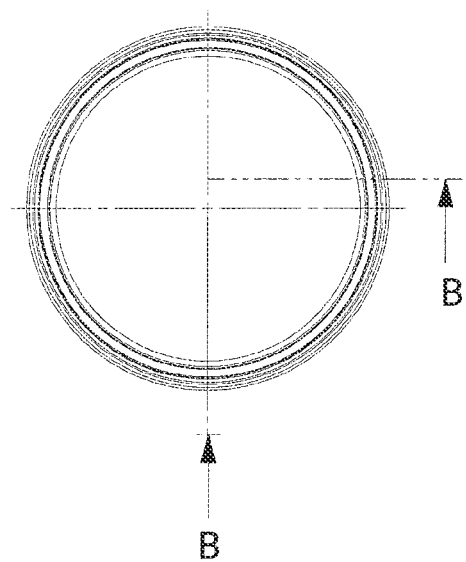
FIG. 32 is a view as in FIG. 30 showing the position of half cross section 'B-B'.
Figure 33:
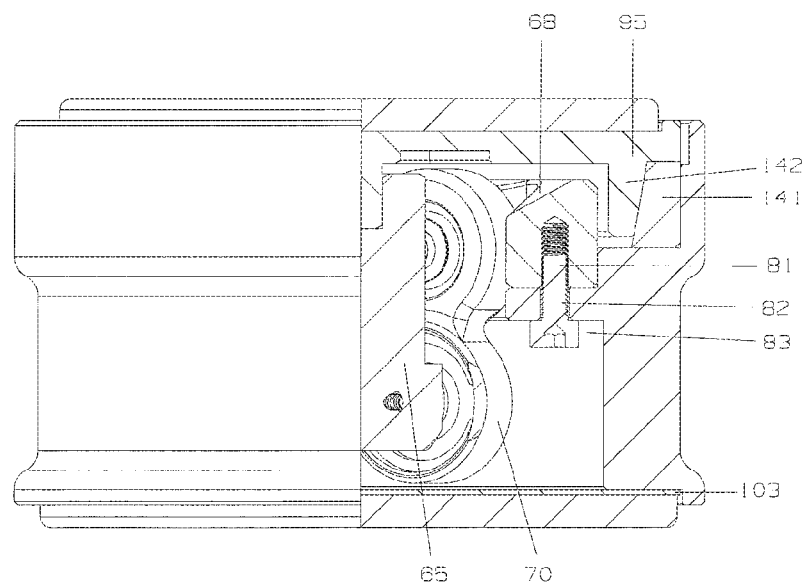
FIG. 33 is a half section on 'B-B' in FIG. 32.
Figure 34:
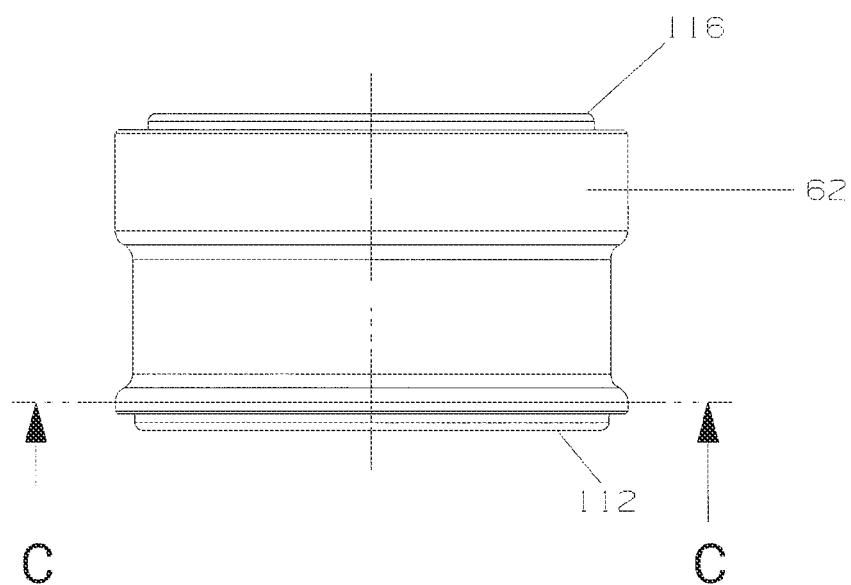
FIG. 34 is aside elevation of the isolator of FIG. 29 showing the position of a cross section 'CC'.
Figure 35:
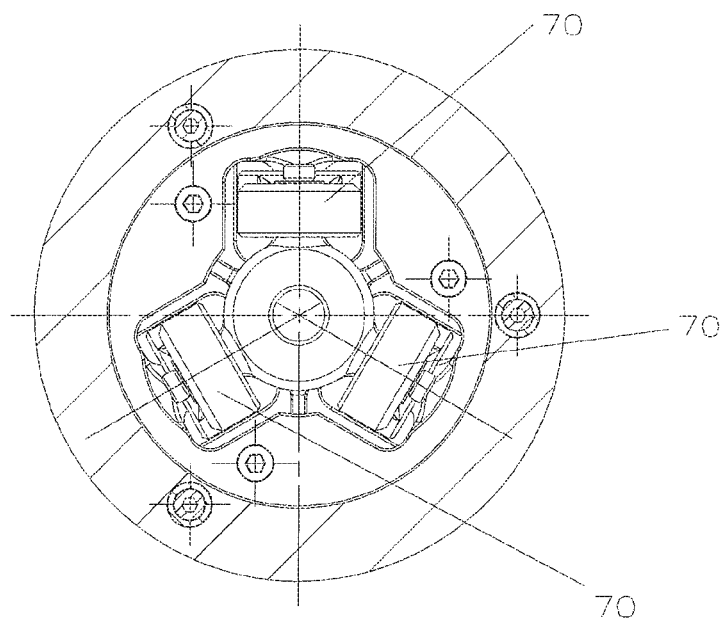
FIG. 35 is a cross section on 'C-C' in FIG. 34.
Figure 36:
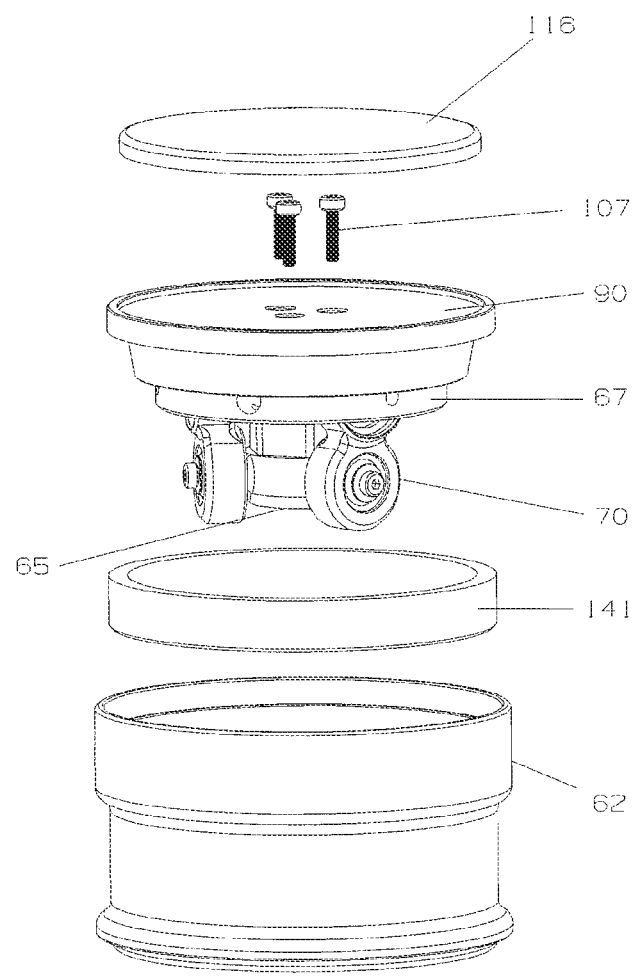
FIG. 36 is a partially exploded view of the isolator of FIG. 29.
Figure 37:
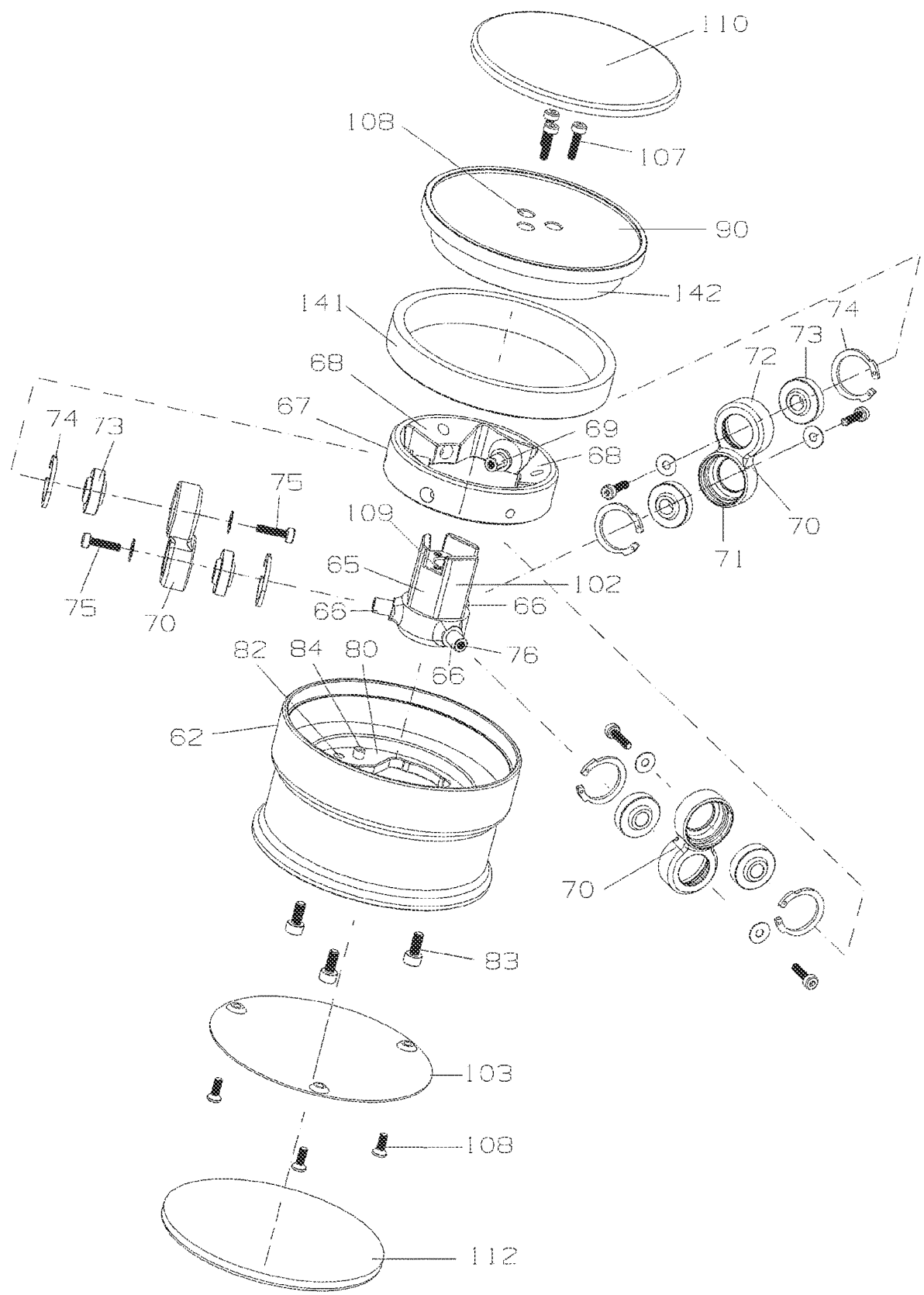
FIG. 37 is an exploded view of the isolator of FIG. 29.

A still further embodiment of the invention is shown in FIGS. 29 to 37. This embodiment is substantially similar to the embodiment of FIGS. 7 to 18 save that no height adjustment feature is shown and damping of the movements of links 70 is provided. In this embodiment the cover part 62 is changed to incorporate a rebate 62' into which an annular damping member 141 is positioned. The damping member 141 may be in the form of a truncated wedge shape in cross-section through the damping member 141, as seen in FIG. 31. The disc 90 is provided with a downwardly depending annular flange 142 the outwardly facing face of which sits against the inwardly facing face of the damping member 141.

The disc 90 is secured to the pendulum member 65 by the bolts 107 and the pendulum member 65 is connected to the cover part 62 through the links 70. The cover part 62 is positioned relative to the disc 90 by the damping member 141. Thus any movement of the links 70 is damped by the damping member 141. A suitable material for the construction of the annular damping member 141 is a silicone rubber material of shore hardness about 25. We believe that materials having a shore hardness in the range of about 15 to 35 would also be able to be used. This embodiment, it is believed, will substantially eliminate vibrations of as little as 1 to 2 microns.

This construction is used substantially as the embodiment in FIGS. 7 to 18 but with the added feature of the damping effected by damping member 141.

INDUSTRIAL APPLICABILITY

The invention is used to eliminate or reduce transmissions of vibrations in a speaker system or similar so as to improve the quality of sound emitted to the environment.

Advantages

The invention provides an effective means of eliminating or reducing unwanted vibrations in apparatus such as a soundbox, in a manner which is simple to assemble and use. Some embodiments also include a measure of damping of relative movements between the support surface and the device creating the vibrations. Some embodiments also include height adjustment of the isolator.

It will be appreciated by persons skilled in the art that numerous variations and/or modifications may be made to the above-described embodiments, without departing from the broad general scope of the present disclosure. The present embodiments are, therefore, to be construed in all respects as illustrative and not restrictive.

The invention claimed is:

1. A link comprising an arm having a first recess or aperture and a second recess or aperture spaced from the first recess or aperture,
    the first recess or aperture being configured for receiving a first bearing and the second recess or aperture being configured for receiving a second bearing,
    the first recess or aperture being configured to be rotatably attachable in use to a first structure via the first bearing and the second recess or aperture being configured to be rotatably attachable in use to a second structure via the second bearing so as to allow movement of one structure substantially independently of an other structure over at least some distance,
    each of the first recess or aperture and the second recess or aperture having an inward facing surface and each of the first bearing and the second bearing having an outward facing surface, and
    the inward facing surface of each of the first and second recesses or apertures and the outward facing surface of each of the first and second bearings being substantially arcuate.

2. The link as claimed in claim 1 wherein a radius of curvature of each said substantially arcuate surface is substantially identical.

3. An isolator comprising
    a base,
    a shell connected to but extending from the base, the shell having an aperture substantially opposite the base,
    a support structure having at least a part thereof positioned within the shell, and
    a plurality of links, each of the links being pivotally connected at or adjacent one end to the shell and being pivotally connected at or adjacent an opposite end to the support structure, a connection between each said link and the support structure being closer to the base than a connection between each said link and the shell; wherein
  each said link comprises an arm having a first recess or aperture and a second recess or aperture spaced from the first recess or aperture,
  the first recess or aperture is configured for receiving a first bearing and the second recess or aperture is configured for receiving a second bearing,
  the first recess or aperture being configured to be rotatably attachable in use to the shell via the first bearing and the second recess or aperture being configured to be rotatably attachable in use to the support structure via the second bearing so as to allow movement of the shell and the support structure substantially independently of each other over at least some distance,
  each of the first recess or aperture and the second recess or aperture has an inward facing surface and each of the first bearing and the second bearing has an outward facing surface, and
  the inward facing surface of each of the first and second recesses or apertures and the outward facing surface of each of the first and second bearings are substantially arcuate.

4. The isolator as claimed in claim 3 wherein the support structure includes a connecting arm having one end positioned within the shell, the connecting arm having means thereon exterior to the shell whereby the connecting arm is connectable to a structure.

5. The isolator as claimed in claim 4 wherein each connection between each said link and the shell and between each said link and the connecting arm allows pivotal movement in a plane of the link and rotational movement about an axis of the link.

6. The isolator as claimed in claim 5 wherein movement between the shell and a support for a sound producing device is damped by a resilient member positioned directly or indirectly therebetween.

7. The isolator as claimed in claim 4 wherein a radius of curvature of each said substantially arcuate surface is substantially identical.

8. The isolator as claimed in claim 7 wherein the connection between each said link and the shell is adjacent the aperture in the shell.

9. The isolator as claimed in claim 8 wherein three said links are provided spaced substantially equidistantly about the shell.

10. The isolator as claimed in claim 9 wherein the base is connected to the shell in a manner which allows adjustment between the base and the shell to allow a distance between the base and the connecting arm to be varied.

11. The isolator according to claim 10 wherein the isolator is mounted between a sound speaker and a supporting surface.

12. The isolator as claimed in claim 3 wherein the support structure includes a disc on which a structure rests in use.

13. The isolator as claimed in claim 12 wherein a radius of curvature of each said substantially arcuate surface is substantially identical.

14. The isolator as claimed in claim 13 wherein the connection between each said link and the shell is adjacent the aperture in the shell.

15. The isolator as claimed in claim 3 wherein a radius of curvature of each said substantially arcuate surface is substantially identical.

16. The isolator as claimed in claim 3 wherein the connection between each said link and the shell is adjacent the aperture in the shell.

17. The isolator as claimed in claim 3 wherein three said links are provided spaced substantially equidistantly about the shell.

18. The isolator as claimed in claim 3 wherein the base is connected to the shell in a manner which allows adjustment between the base and the shell to allow a distance between the base and the connecting arm to be varied.

19. The isolator as claimed in claim 3 wherein the connecting arm extends outwardly through the aperture in the shell.

20. The isolator according to claim 3 wherein the isolator is mounted between a sound speaker and a supporting surface.

* * * * *